United States Patent
Lee

(10) Patent No.: US 9,209,481 B2
(45) Date of Patent: Dec. 8, 2015

(54) RECHARGEABLE BATTERY WITH AN ELECTRODE ASSEMBLY HAVING A POLYMER REGION

(75) Inventor: Jea-Woan Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 499 days.

(21) Appl. No.: 13/101,762

(22) Filed: May 5, 2011

(65) Prior Publication Data
US 2011/0212351 A1    Sep. 1, 2011

Related U.S. Application Data

(63) Continuation of application No. 11/864,788, filed on Sep. 28, 2007, now Pat. No. 7,960,049.

(30) Foreign Application Priority Data

Nov. 17, 2006 (KR) ................ 10-2006-0113975

(51) Int. Cl.
| | |
|---|---|
| *H01M 10/0587* | (2010.01) |
| *H01M 10/052* | (2010.01) |
| *H01M 4/66* | (2006.01) |
| *H01M 4/70* | (2006.01) |
| *H01M 4/131* | (2010.01) |
| *H01M 4/134* | (2010.01) |

(52) U.S. Cl.
CPC .............. *H01M 10/052* (2013.01); *H01M 4/66* (2013.01); *H01M 4/70* (2013.01); *H01M 10/0587* (2013.01); *H01M 4/131* (2013.01); *H01M 4/134* (2013.01); *Y02E 60/122* (2013.01)

(58) Field of Classification Search
CPC ................................. H01M 10/0587
See application file for complete search history.

(56) References Cited

U.S. PATENT DOCUMENTS

| 3,862,861 A | 1/1975 | McClelland et al. |
|---|---|---|
| 6,548,204 B1 * | 4/2003 | Kim et al. ............. 429/94 |
| 7,063,916 B2 | 6/2006 | Ugawa et al. |
| 7,927,746 B2 * | 4/2011 | Miller et al. .......... 429/246 |
| 2003/0118908 A1 * | 6/2003 | Ishikawa et al. ....... 429/231.8 |

(Continued)

FOREIGN PATENT DOCUMENTS

| KR | 2003-0042578 | 6/2003 |
|---|---|---|
| KR | 10-2004-0076831 | 9/2004 |
| KR | 10-2006-0010658 | 2/2006 |

OTHER PUBLICATIONS

Korean Patent Abstracts, Publication No. 1020030042578 A; Date of Publication: Jun. 2, 2003, in the name of Chan Hui Lee et al.

(Continued)

*Primary Examiner* — Maria J Laios
(74) *Attorney, Agent, or Firm* — Christie, Parker & Hale, LLP

(57) ABSTRACT

A rechargeable lithium battery including an electrode assembly having a positive electrode including a positive current collector partially coated with a positive active material to form a positive coated region and a positive uncoated region, a negative electrode including a negative current collector partially coated with a negative active material to form a negative coated region and a negative uncoated region and a separator between the positive electrode and the negative electrode. The electrode assembly is spirally wound a plurality of times with the positive uncoated region and the negative uncoated region together forming a core central to the spirally-wound electrode assembly and wound from 3 to 15 times.

13 Claims, 7 Drawing Sheets

(56) References Cited

U.S. PATENT DOCUMENTS

| | | | |
|---|---|---|---|
| 2004/0151987 A1* | 8/2004 | Kawase et al. | 429/338 |
| 2004/0202928 A1* | 10/2004 | Miyamoto et al. | 429/137 |
| 2005/0221172 A1* | 10/2005 | Kato et al. | 429/144 |
| 2006/0093922 A1 | 5/2006 | Kim et al. | |
| 2008/0008933 A1 | 1/2008 | Lampe-Onnerud | |

OTHER PUBLICATIONS

Korean Patent Abstracts, Publication No. 1020040076831 A; Date of Publication: Sep. 3, 2004, in the name of Yoshikumi Miyamoto et al.

Korean Patent Abstracts, Publication No. 1020060010658 A; Date of Publication: Feb. 2, 2006, in the name of Jae Woong Kim et al.

\* cited by examiner

RECHARGEABLE BATTERY WITH AN ELECTRODE ASSEMBLY HAVING A POLYMER REGION

CROSS-REFERENCE TO RELATED APPLICATION

This application is a continuation of application Ser. No. 11/864,788 filed Sep. 28, 2007, which claimed priority to and the benefit of the filing date of Korean Patent Application No. 10-2006-0113975, filed in the Korean Intellectual Property Office on Nov. 17, 2006, the disclosures of which are incorporated fully herein by reference.

BACKGROUND OF THE INVENTION

1. Field of the Invention

The present invention relates to a rechargeable lithium battery. More particularly, the present invention relates to a rechargeable lithium battery having improved structural and/or thermal stability.

2. Description of the Related Art

Rechargeable lithium batteries use materials that are capable of reversibly intercalating or deintercalating lithium ions as positive and negative active materials, and include an organic electrolyte solution or a polymer electrolyte between the positive and negative electrodes. Rechargeable lithium batteries generate electrical energy through an oxidation/reduction reaction during the intercalation/deintercalation of lithium ions at the positive and negative electrodes.

Chalcogenide compounds have been used for positive active materials. Chalcogenide compounds including composite metal oxides such as $LiCoO_2$, $LiMn_2O_4$, $LiNiO_2$, $LiNi_{1-x}Co_xO_2$ (0<x<1), $LiMnO_2$, and so on have been researched.

Conventionally, lithium metals have been used as a negative active material for rechargeable lithium batteries. However, an explosion may be caused by a short circuit of the battery due to formation of dendrites when using a lithium metal. Therefore, carbonaceous materials such as amorphous carbon, crystalline carbon, etc., have recently been substituted as the negative active material in place of lithium metal. However, since carbon-based materials have a limited capacity, higher capacity materials are needed. Accordingly, to satisfy the high capacity requirement and to provide a high-capacity battery, metal-based negative active materials such as Si, Sn, and so on have been actively studied.

Since a rechargeable lithium battery including a non-carbon-based negative active material may have too much substrate expansion during charge and discharge, a core of a spirally wound electrode assembly especially in a cylindrical battery, may be severely misshapen. An electrode assembly 100 is formed by spirally winding positive and negative electrodes and having a separator interposed therebetween. The core, as shown in FIG. 1, includes a hollow space C in the center of the electrode assembly so that a pin may be inserted into the hollow space C. The hollow space is created after a mandril used for spirally winding the positive and negative electrodes is removed from the electrode assembly.

When a rechargeable lithium battery, in particular one including a non-carbon-based negative active material, incurs substrate expansion during repeated charge and discharge, the substrate expansion often occurs at the hollow space rather than at the periphery because the substrate is prevented from expanding by the can.

According to a conventional art, a center pin (mandril) is inserted to prevent expansion. However, an additional process of inserting a pin is therefore needed, making the manufacturing process complicated and thereby increasing the manufacturing cost. Accordingly, when an electrode includes a metal-based material that severely expands during charge and discharge, a jelly-roll type of electrode assembly may also be severely misshapen at its center, which deteriorates the cycle-life characteristic.

SUMMARY OF THE INVENTION

The present invention provides a rechargeable lithium battery having an electrode assembly which includes a positive electrode having a positive current collector partially coated with a positive active material to form a positive coated region and a positive uncoated region. It also has a negative electrode having a negative current collector partially coated with a negative active material to form a negative coated region and a negative uncoated region. The positive and negative electrodes has a separator between them wherein the electrode assembly is spirally wound a plurality of times with the positive uncoated region and the negative uncoated region together forming a core central to the spirally-wound electrode assembly and wound from 3 to 15 times or from 7 to 15 times. The separator may or may not extend into the core. The positive and negative uncoated regions are coated with a polymer.

Another embodiment of the invention is that the negative active material of the invention is selected from the group having transition element oxides, materials capable of doping and dedoping lithium, material that is capable of reversibly reacting with lithium, and combinations thereof. Also, the negative active material is selected from the group which includes Si, $SiO_x$ where 0<x<2, Sn, $SnO_2$ and combinations thereof.

DETAILED DESCRIPTION

Figure 1:
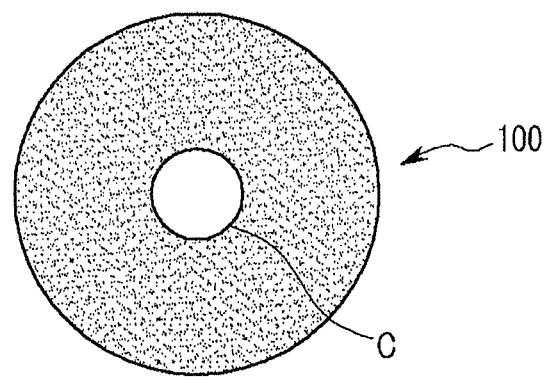
FIG. 1 is a schematic horizontal cross-sectional view of an electrode assembly of a conventional rechargeable lithium battery.

An exemplary rechargeable lithium battery of the present invention includes an electrode assembly formed by spirally winding an electrode assembly member including positive and negative electrodes with a separator interposed therebetween.

The positive electrode includes a positive current collector partially coated with a positive active material to form a positive coated region and a positive uncoated region. The negative electrode includes a negative current collector partially coated with a negative active material to form a negative coated region and a negative uncoated region.

According to an exemplary embodiment of the present invention, the positive and negative uncoated regions together with the separator interposed between the positive and negative uncoated regions form a core located in the center of the wound electrode assembly.

In one exemplary embodiment, the core is spirally wound between 3 and 15 times and in another exemplary embodiment, between 7 and 15 times.

Since the core is absent active material, the core does not participate in a chemical reaction, but may still expand or shrink. Accordingly, the present invention may prevent the core from being misshapen due to internal expansion of the core itself, although the core may still change shape due expansion of the electrodes during charge and discharge.

The volume expansion suppression effect may be maximally obtained when a non-carbon-based material is used as the negative active material. Exemplary negative active materials may include transition element oxides, materials capable of doping and dedoping lithium, materials capable of forming a compound by reversible reactions with lithium, and combinations thereof.

Examples of materials capable negative active materials include $SiO_x$ (where $0<x<2$), $SnO_2$, vanadium oxide, lithium vanadium oxide, Si, Sn, tin alloy composites, titanium nitrate, and so on.

The current collector may be selected from copper foil, nickel foil, stainless steel foil, titanium foil, nickel foam, copper foam, a polymer substrate coated with conductive metal, and combinations thereof.

The negative electrode may be fabricated as follows: a negative active material composition is prepared by mixing a negative active material, a binder, and optionally a conductive material. The composition is then applied on a negative current collector such as copper. This method of manufacturing the negative electrode is well known, and thus is not described in detail in the present specification.

The binder may be selected from t polyvinylalcohol, carboxylmethylcellulose, hydroxypropylenecellulose, diacetylenecellulose, polyvinylchloride, polyvinylpyrrolidone, polytetrafluoroethylene, polyvinylidene fluoride, polyethylene, and polypropylene, but is not limited thereto.

Any electrically conductive material may be used as a conductive material unless it causes a chemical change. Examples of the conductive material include natural graphite, artificial graphite, carbon black, acetylene black, ketjen black, carbon fiber, metal powder or metal fiber including copper, nickel, aluminum, silver, and so on, and a polyphenylene derivative.

N-methylpyrrolidone may be used for the solvent, but the solvent is not limited thereto.

The positive active material may be a lithiated intercalation compound capable of intercalating and deintercalating lithium ions. Examples of lithiated intercalation compounds may be composite oxides including lithium and a metal selected from cobalt, manganese, nickel, and combinations thereof. The lithiated intercalation compound may be a compound selected from the group consisting of the compounds represented by the following Formulas 1 to 24.

$$Li_aA_{1-b}B_bD_2 \quad \text{Formula 1}$$

wherein $0.95 \leq a \leq 1.1$ and $0 \leq b \leq 0.5$.

$$Li_aE_{1-b}B_bO_{2-c}F_c \quad \text{Formula 2}$$

wherein $0.95 \leq a \leq 1.1$, $0 \leq b \leq 0.5$, and $0 \leq c \leq 0.05$.

$$LiE_{2-b}B_bO_{4-c}F_c \quad \text{Formula 3}$$

wherein $0 \leq b \leq 0.5$ and $0 \leq c \leq 0.05$.

$$Li_aNi_{1-b-c}Co_bB_cD_\alpha \quad \text{Formula 4}$$

wherein $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}F_\alpha \quad \text{Formula 5}$$

wherein $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \quad \text{Formula 6}$$

wherein $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \quad \text{Formula 7}$$

wherein $0.95 \leq a \leq 1.1$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha \quad \text{Formula 8}$$

wherein $0.95 \leq a \leq 1.1$, $0 \leq b \leq 0.5$, $0 \leq c \leq 0.05$, and $0 \leq \alpha \leq 2$.

$$Li_aNi_{1-b-c}Mn_bB_cO_{2-\alpha}F_2 \quad \text{Formula 9}$$

wherein $0.95 \leq a \leq 1.1$, $0 \leq b \leq 0.5$, $0 \leq c \leq 0.05$, and $0 \leq \alpha \leq 2$.

$$Li_aNi_bE_cG_dO_2 \quad \text{Formula 10}$$

wherein $0.90 \leq a \leq 1.1$, $0 \leq b \leq 0.9$, $0 \leq c \leq 0.5$, and $0.001 \leq d \leq 0.1$.

$$Li_aNi_bCo_cMn_dGeO_2 \quad \text{Formula 11}$$

wherein $0.90 \leq a \leq 1.1$, $0 \leq b \leq 0.9$, $0 \leq c \leq 0.5$, $0 \leq d \leq 0.5$ and $0.001 \leq e \leq 0.1$.

$$Li_aNIG_bO_2 \quad \text{Formula 12}$$

wherein $0.90 \leq a \leq 1.1$ and $0.001 \leq b \leq 0.1$.

$$Li_aCoG_bO_2 \quad \text{Formula 13}$$

wherein $0.90 \leq a \leq 1.1$ and $0.001 \leq b \leq 0.1$.

$$Li_aMnG_bO_2 \quad \text{Formula 14}$$

wherein $0.90 \leq a \leq 1.1$ and $0.001 \leq b \leq 0.1$.

$$Li_aMn_2G_bO_4 \quad \text{Formula 15}$$

wherein $0.90 \leq a \leq 1.1$ and $0.001 \leq b \leq 0.1$.

$$QO_2 \quad \text{Formula 16}$$

$$QS_2 \quad \text{Formula 17}$$

$$LiQS_2 \quad \text{Formula 18}$$

$$V_2O_5 \quad \text{Formula 19}$$

$$LiV_2O_5 \quad \text{Formula 20}$$

$$LiIO_2 \quad \text{Formula 21}$$

$$LiNiVO_4 \quad \text{Formula 22}$$

$$Li_{3-f}J_2(PO_4)_3 (0 \leq f \leq 3) \quad \text{Formula 23}$$

$$Li_{3-f}Fe_2(PO_4)_3 (0 \leq f \leq 2) \quad \text{Formula 24}$$

In the above Formulas 1 to 24, A is selected from Ni, Co, Mn, and combinations thereof; B is selected from Al, Ni, Co, Mn, Cr, Fe, Mg, Sr, V, a rare earth element, and combinations thereof; D is selected from O, F, S, P, and combinations thereof; E is selected from Co, Mn, and combinations thereof;

F is selected from F, S, P, and combinations thereof; G is a transition element or a lanthanide element selected from Al, Cr, Mn, Fe, Mg, La, Ce, Sr, V, and combinations thereof; Q is selected from Ti, Mo, Mn, and combinations thereof; I is selected from Cr, V, Fe, Sc, Y, and combinations thereof; and J is selected from V, Cr, Mn, Co, Ni, Cu, and combinations thereof.

The positive electrode may be fabricated as follows: a positive active material composition is prepared by mixing a positive active material, a binder, and optionally a conductive material. The composition is then applied on a positive current collector such as aluminum.

The separator may include polyethylene, polypropylene, polyvinylidene fluoride, and multilayers thereof such as a polyethylene/polypropylene bilayered separator, a polyethylene/polypropylene/polyethylene three-layered separator, or a polypropylene/polyethylene/polypropylene three-layered separator.

According to another exemplary embodiment of the present invention, an electrode assembly includes a polymer layer disposed on the positive and negative uncoated regions, and forming a core central to the electrode assembly. The core may be spirally wound between about 3 to 15 times. According to another embodiment of the present invention, the core may be spirally wound between 5 and 10 times.

When the core is spirally wound fewer than 3 times, it may not be strong enough to support expansion of a substrate, while when it is wound more than 15 times, the additional rotations do not participate in an electro-chemical reaction and they take up space, which may lead to decreased capacity.

Examples of a polymer for forming the polymer layer may include any polymer that does not participate in an electrochemical reaction and does not dissolve in a reaction with an electrolyte. Polymers may be selected from styrene-butadiene rubber, polyvinylidene fluoride, polyethylene, polypropylene, and combinations thereof.

The polymer layer may have a thickness ranging from between about 1 to 30 μm and more particularly between about 5 to 10 μm. The polymer layer may be formed on one or both sides of the positive and negative uncoated regions.

The rechargeable lithium battery includes an electrolyte including a non-aqueous organic solvent and a lithium salt. The non-aqueous organic solvent acts as a medium for transmitting ions participating in the electrochemical reaction of the battery.

The non-aqueous organic solvent may include a carbonate-based, ester-based, ether-based, ketone-based, alcohol-based, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Examples of the ester-based solvent include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethanol and isopropyl alcohol, and examples of the aprotic solvent include a nitrile such as R—CN (wherein R is a C2 to C20 linear, branched, or cyclic hydrocarbon, an aromatic ring with a double bond, or one with an ether bond), an amide such as dimethylformamide, a dioxolane such as 1,3-dioxolane, a sulfolane, and so on.

The non-aqueous organic solvent may be used singularly or in mixture. When the organic solvent is used in mixture, the mixture ratio may be controlled in accordance with a desirable battery performance.

The carbonate-based solvent may include a mixture of a cyclic carbonate and a chain carbonate. When the cyclic carbonate and the chain carbonate are mixed together in a volume ratio of at between about 1:1 to 1:9, and the mixture is used as an electrolyte, the electrolyte performance may be enhanced.

In addition, the electrolyte according to an exemplary embodiment of the present invention may further include mixtures of carbonate-based solvents and aromatic hydrocarbon-based solvents. The carbonate-based solvents and the aromatic hydrocarbon-based solvents are preferably mixed together in a volume ratio of between about 1:1 to 30:1.

The aromatic hydrocarbon-based organic solvent may be represented by the following Formula 25.

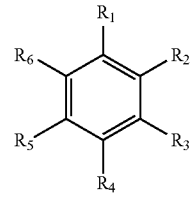

Formula 25 wherein each of $R_1$ to $R_6$ is independently selected from hydrogen, a halogen, a C1 to C10 alkyl, a haloalkyl, and combinations thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include an additive such as ethylenecarbonate or pyrocarbonate, to inhibit overcharge.

The lithium salt is dissolved in the organic solvent and acts as a lithium-ion source, helping basic battery operation while promoting a lithium transfer between the positive and negative electrodes. According to one embodiment of the present invention, the lithium salt includes at least one supporting salt selected from $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ where x and y are natural numbers, LiCl, LiI, and lithium bisoxalate borate. The lithium salt may be used at a concentration of between about 0.1 to 2.0M. When the lithium salt concentration is less than 0.1M, electrolyte performance may be deteriorated due to low electrolyte conductivity, whereas when it is more than 2.0M, lithium ion mobility may be reduced due to an increase in electrolyte viscosity.

An electrode assembly for a rechargeable lithium battery of the present invention will be illustrated in detail referring to accompanying drawings. However, the present invention may be accomplished in various ways, and is not limited to that shown in the drawings.

Figure 2:
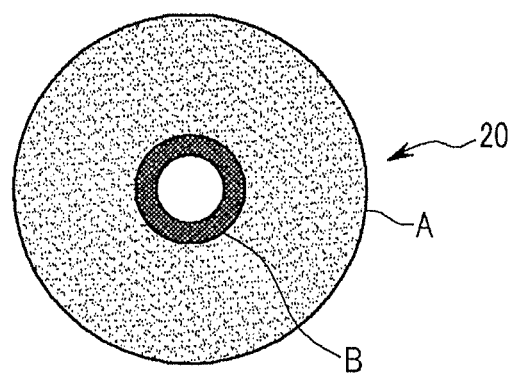
FIG. 2 is a schematic horizontal cross-sectional view of an electrode assembly of a rechargeable lithium battery according to an exemplary embodiment of the present invention.

FIG. 2 shows a horizontal cross-sectional view of an exemplary electrode assembly 20 for a rechargeable lithium battery of the present invention. As shown in FIG. 2, the electrode assembly 20 includes a core (B) in its center. For clarity, the portion excluding the core (B) is called a shell part (A), and is illustrated in more detail.

Figure 3:
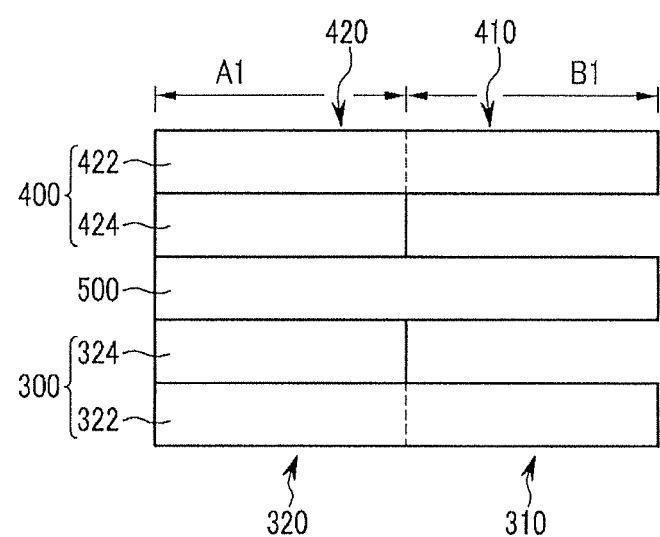
FIG. 3 is a schematic vertical cross-sectional view of the electrode assembly of FIG. 2.

FIG. 3 shows a cross-sectional view of the electrode assembly of FIG. 2. As shown in FIG. 3, the electrode assembly includes a positive electrode 400, a negative electrode 300, and a separator 500 interposed between the positive electrode 400 and the negative electrode 300.

In addition, a core B1 includes a current collector that is absent an active material. More specifically, the current collector includes a positive uncoated region 410 and a negative uncoated region 310, and a separator 500 interposed between the positive uncoated region 410 and the negative uncoated region 310. A shell part (A1) includes a positive coated region 420 having a positive current collector 422, and a positive active material layer 424 formed on the positive current collector 422, a separator 500, and a negative coated region 320, having a negative current collector 322, and a negative active material layer 324 disposed on the negative current collector 322.

Figure 4:
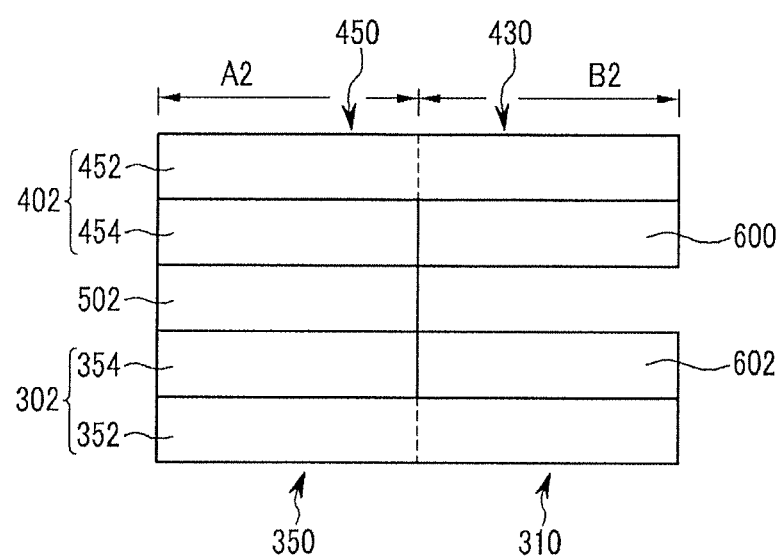
FIG. 4 is a schematic vertical cross-sectional view of an electrode assembly of a rechargeable lithium battery according to another exemplary embodiment of the present invention.

FIG. 4 shows a cross-sectional view of an electrode assembly according to another exemplary embodiment of the present invention. As shown in FIG. 4, a core B2 includes a current collector that is absent a positive active material. More specifically, the core B2 includes a positive uncoated region 430 including a polymer layer 600 disposed on a positive current collector 452 and a negative uncoated region 310 including a polymer layer 602 disposed on a current collector 352. In addition, a shell part (A2) includes a positive coated region 450 having a positive current collector 452 and a positive active material layer 454 disposed thereon, a separator 502, and a negative coated region 350 having a current collector 352 and a negative active material layer 354 thereon.

Figure 5:
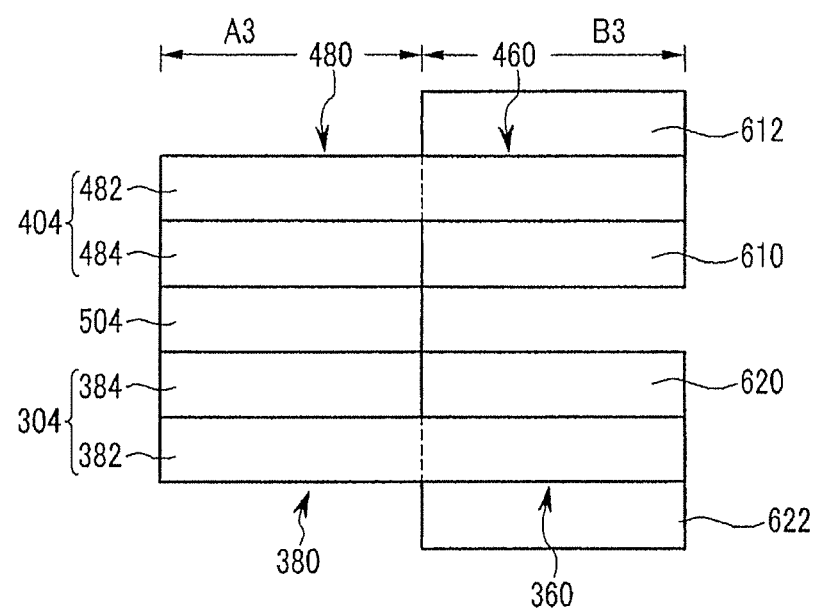
FIG. 5 is a schematic vertical cross-sectional view of an electrode assembly of a rechargeable lithium battery according to yet another exemplary embodiment of the present invention.

FIG. 5 shows a cross-sectional view of an electrode assembly according to yet another exemplary embodiment of the present invention. As shown in FIG. 5, a core B3 includes a positive uncoated region 460 and polymer layers 610, 612 disposed on both sides of a positive current collector 482, and a negative uncoated region 360 and polymer layers 620, 622 disposed on both sides of a negative current collector 382. In addition, a shell part A3 includes a positive coated region 480, having a positive current collector 482 and a positive active material layer 484 disposed thereon, a separator 504, and a negative coated region 380 having a negative current collector 382 and a negative active material layer 384 disposed thereon.

Figure 6:
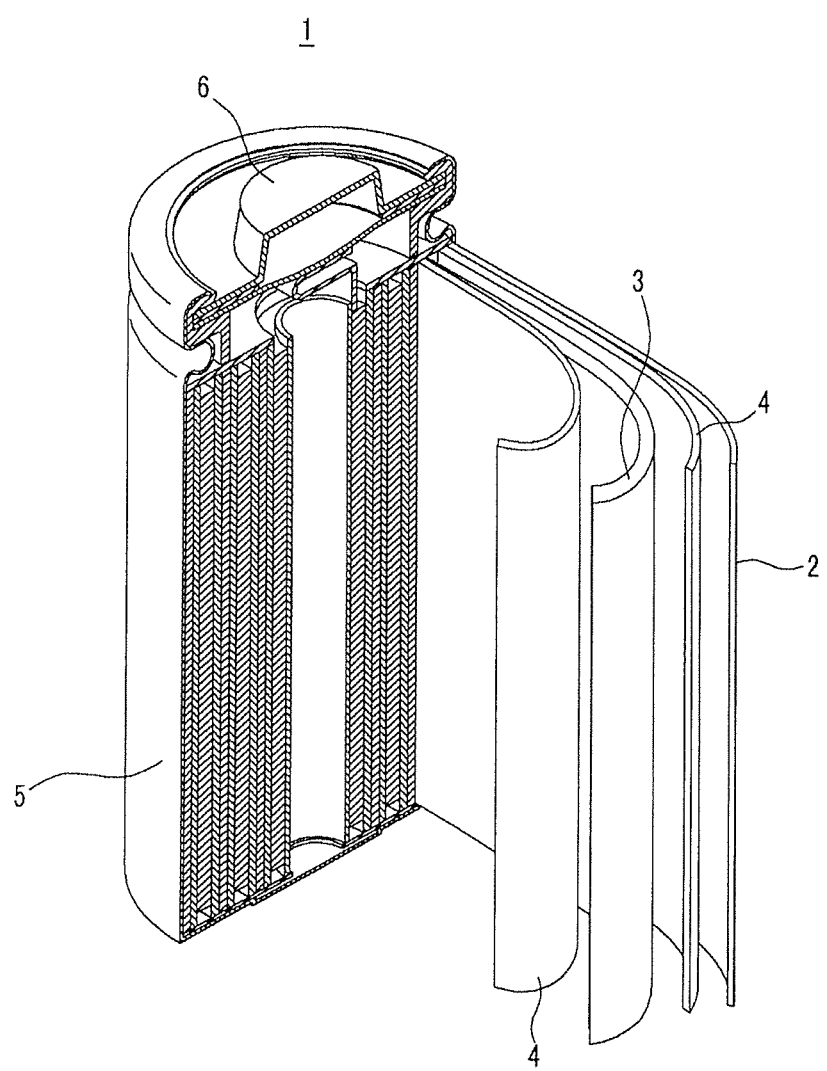
FIG. 6 is a schematic structure of a rechargeable lithium battery according to an exemplary embodiment of the present invention.

FIG. 6 shows an exemplary rechargeable lithium battery of the present invention. As shown in FIG. 6, the rechargeable lithium battery 1 includes a battery case 5 including an electrolyte infiltrating a positive electrode 2, a negative electrode 3, a separator 4 interposed between the positive electrode 2 and the negative electrode 3, and a sealing member 6 sealing the case 5.

The following examples illustrate embodiments of the present invention in more detail. These examples, however, should not be interpreted as limiting the scope of the present invention.

Example 1

94 wt % of a $LiCoO_2$ positive active material, 3 wt % of a super P conductive material, and 3 wt % of a polyvinylidene fluoride binder were mixed in an N-methyl pyrrolidone solvent to prepare a positive active material slurry. The $LiCoO_2$ positive active material had a charge capacity of 160 mAh/g when initially charged to 4.3V at 0.1 C, and a discharge capacity of 157 mAg/g when discharged to 3.0V.

The positive active material slurry was coated on an entire Al-foil current collector except at one end thereof (an uncoated region), and then dried to fabricate a positive electrode including a positive uncoated region and a positive active material layer.

90 wt % of a Si negative active material and 10 wt % of a polyvinylidene fluoride binder were then mixed in N-methylpyrrolidone, preparing a negative active material slurry. The negative active material slurry was coated on an entire Cu foil current collector except at one end thereof (an uncoated region) and dried, fabricating a negative electrode including a negative uncoated region and a negative active material layer.

A polyethylene polymer separator was then interposed between the positive and negative electrodes, the positive and negative electrodes then being spirally wound together to prepare an electrode assembly. Herein, the cell was regulated to have a negative active material vs. positive active material (N/P) ratio of about 1:1.2, based on reversible capacity. The cell included an electrolyte solution prepared by dissolving 1M $LiPF_6$ lithium salt in a solvent of ethylene carbonate and ethylmethyl carbonate mixed in a volume ratio of about 1:1.

In addition, the electrode assembly included a core in the center. The core included a positive uncoated region, a negative uncoated region, and a separator, and was spirally wound eight times. The core had a thickness of about 1 mm and a diameter of about 4 mm.

Example 2

An electrode assembly was prepared by the same method as in Example 1, except that a polymer layer was respectively disposed on the positive and negative uncoated regions. The polymer layer was formed by preparing a polymer solution by adding a polyvinylidene fluoride polymer to an N-methylpyrrolidone solvent and coating the polymer solution on each side of positive and negative uncoated regions to a thickness of about 16 μm. Herein, the core was spirally wound five times and had a thickness of about 1 mm and a diameter of about 4 mm.

Example 3

An electrode assembly was prepared by the same method as in Example 1, except that a polymer layer was disposed only on a positive uncoated region. The polymer layer was formed by preparing a polymer solution by adding a polyvinylidene fluoride polymer to an N-methylpyrrolidone solvent and coating the polymer solution on both sides of a positive uncoated region to have a thickness of about 16 μm. Herein, the core was spirally wound 7 times and had a thickness of about 1 mm and a diameter of about 4 mm.

Example 4

An electrode assembly was prepared by the same method as in Example 1, except that a $SiO_x$ (0<x<2) negative active material was used.

Comparative Example 1

94 wt % of LiCoO$_2$ positive active material, 3 wt % of a super P conductive material, and 3 wt % of a polyvinylidene fluoride binder were mixed in an N-methyl pyrrolidone solvent to prepare a positive active material slurry. Herein, the LiCoO$_2$ positive active material had a charge capacity of 160 mAh/g when initially charged to 4.3V at 0.1 C, and a discharge capacity of 157 mAg/g when discharged to 3.0V.

The positive active material slurry was coated on an entire Al-foil current collector except at one end (an uncoated region), and then dried to prepare a positive electrode including a positive uncoated region and a positive active material layer.

90 wt % of a Si negative active material and 10 wt % of a polyvinylidene fluoride binder were mixed in N-methylpyrrolidone to prepare a negative active material slurry. The negative active material slurry was coated on an entire Cu-foil current collector except at one end (an uncoated region), and then dried to prepare a negative electrode including a negative uncoated region and negative active material layer.

An electrode assembly was then prepared by interposing a polyethylene polymer separator between the positive and negative electrodes and spirally winding them together. Herein, the cell was regulated to have an N/P ratio of about 1:1.2, based on reversible capacity, and the cell included an electrolyte solution prepared by dissolving 1M LiPF$_6$ in a solvent of ethylene carbonate and ethylmethyl carbonate mixed in a volume ratio of about 1:1. In addition, a center pin made of stainless steel (SUS) was inserted in a hollow space in the middle of the electrode assembly.

Figure 7:
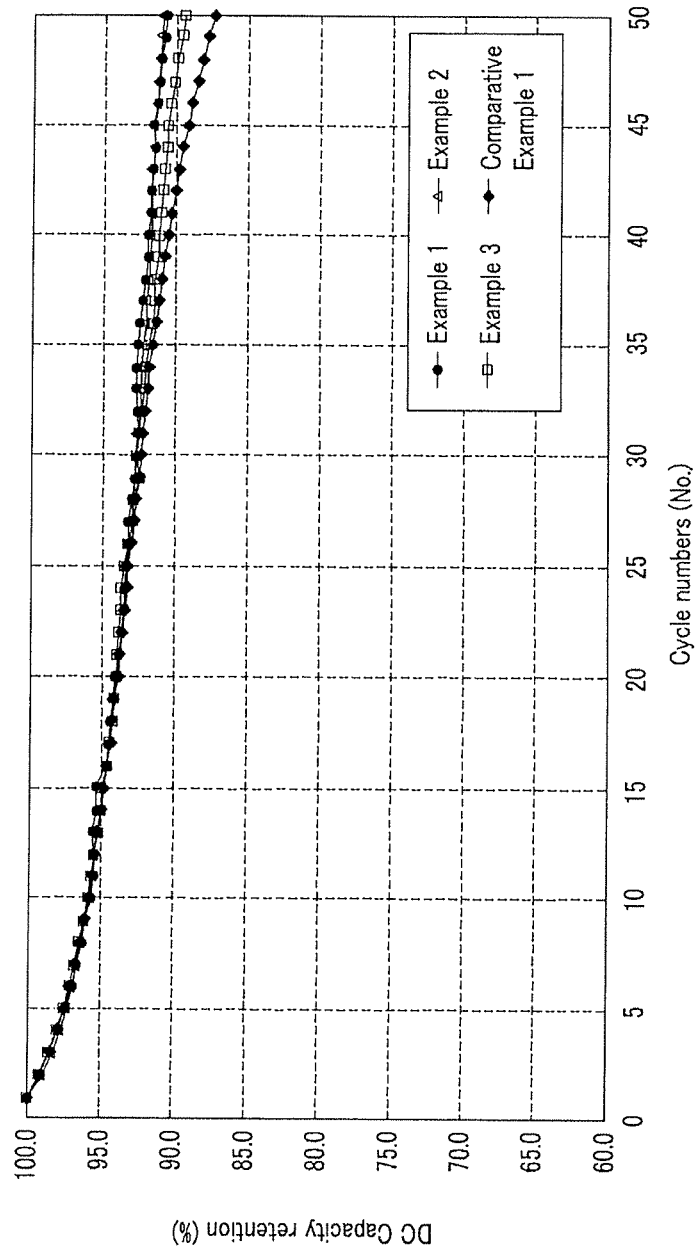
FIG. 7 is a graph showing cycle-life characteristics of rechargeable lithium batteries according to Examples 1 to 3 of the present invention and Comparative Example 1.

After charging and discharging cells prepared according to Examples 1 to 3 and Comparative Example 150 times, the cells cycle-life characteristics were estimated. The results are shown in FIG. 7. The cycle-life characteristics are illustrated as a ratio of discharge capacity at each cycle number versus initial discharge capacity. As shown in FIG. 7, cells of Example 1 to 3 and Comparative Example 1 had similar values up to about 35 cycles, but that of Comparative Example 1 had sharply decreased capacity retention. In addition, the cell of Example 4 exhibited similar capacity retention as the cells of Examples 1 to 3.

Therefore, since a rechargeable lithium battery of the present invention has an electrode assembly core not severely distorted due to electrode expansion during charge and discharge, it may have an improved cycle-life. In addition, since the electrode assembly is more easily fabricated without using a center pin, the present invention may have improved productivity and decreased manufacturing cost, increasing the product's competitiveness.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising an electrode assembly comprising:
   a first electrode comprising a first current collector coated on a first portion with a first active material to form a first active region and coated on a second portion with a polymer to form a first polymer region, wherein ends of the first active region and the first polymer region contact each other;
   a second electrode comprising a second current collector coated on a first portion with a second active material to form a second active region and coated on a second portion with the polymer to form a second polymer region, wherein ends of the second active region and the second polymer region contact each other; and
   a separator between the first electrode and the second electrode, wherein the electrode assembly is wound a plurality of times with the first and second polymer regions forming a core central to the electrode assembly, wherein the separator is spaced from the core.

2. The rechargeable lithium battery of claim 1, wherein the core is wound between 5 to 10 times.

3. The rechargeable lithium battery of claim 1, wherein the polymer is selected from the group consisting of styrene-butadiene rubber, polyvinylidene fluoride, polyethylene, polypropylene, and combinations thereof.

4. The rechargeable lithium battery of claim 1, wherein the polymer is coated on both sides of the polymer regions.

5. The rechargeable lithium battery of claim 1, wherein the second active material is selected from the group consisting of transition element oxides, materials capable of doping and dedoping lithium, materials capable of reversibly reacting with lithium, and combinations thereof.

6. The rechargeable lithium battery of claim 5, wherein the second active material is selected from the group consisting of Si, SiO$_x$ where 0<x<2, Sn, SnO$_2$, and combinations thereof.

7. The rechargeable lithium battery of claim 1, wherein the polymer layers have a thickness of between about 1 and 30 μm.

8. The rechargeable lithium battery of claim 7, wherein the thickness is between about 5 and 10 μm.

9. The rechargeable lithium battery of claim 1, wherein the first electrode is a positive electrode and the second electrode is a negative electrode.

10. The rechargeable lithium battery of claim 1, wherein the polymer comprises polyvinylidene fluoride.

11. The rechargeable lithium battery of claim 1, wherein the separator comprises polyethylene, polypropylene, polyvinylidene fluoride or a combination thereof.

12. The rechargeable lithium battery of claim 1, wherein the separator has a plurality of layers.

13. The rechargeable lithium battery of claim 1, wherein the polymer is a nonelectro-chemical reactable and/or an electrolyte non-dissolvable polymer.

* * * * *